US009764616B2

United States Patent
Hegar et al.

(10) Patent No.: US 9,764,616 B2
(45) Date of Patent: *Sep. 19, 2017

(54) EXTERNAL NOISE REDUCTION OF HVAC SYSTEM FOR A VEHICLE

(71) Applicant: THERMO KING CORPORATION, Minneapolis, MN (US)

(72) Inventors: Michal Hegar, Prague (CZ); Arnost Hurych, Prague (CZ); Michal Kolda, Prague (CZ); Antonin Ryska, Prague (CZ)

(73) Assignee: THERMO KING CORPORATION, Minneapolis, MN (US)

( * ) Notice: Subject to any disclaimer, the term of this patent is extended or adjusted under 35 U.S.C. 154(b) by 189 days.

This patent is subject to a terminal disclaimer.

(21) Appl. No.: 14/728,739

(22) Filed: Jun. 2, 2015

(65) Prior Publication Data

US 2015/0258874 A1 Sep. 17, 2015

Related U.S. Application Data

(63) Continuation of application No. 13/017,896, filed on Jan. 31, 2011, now abandoned, which is a
(Continued)

(51) Int. Cl.
 *B60H 1/00* (2006.01)
 *B60H 1/32* (2006.01)

(52) U.S. Cl.
 CPC ..... *B60H 1/00735* (2013.01); *B60H 1/00007* (2013.01); *B60H 1/00321* (2013.01);
 (Continued)

(58) Field of Classification Search
 CPC ............ B60H 1/00735; B60H 1/00007; B60H 1/00321; B60H 1/00371; B60H 1/00507; B60H 1/00764
 (Continued)

(56) References Cited

U.S. PATENT DOCUMENTS 3,720,073 A 3/1973 McCarthy
4,272,015 A 6/1981 Houser
(Continued)

FOREIGN PATENT DOCUMENTS

DE 4138355 5/1993
DE 4217394 12/1993
(Continued)

OTHER PUBLICATIONS

Search Report from the European Patent Office for European Application No. EP 13 17 8284 dated Jan. 21, 2014 (8 pages).
(Continued)

*Primary Examiner* — Davis Hwu
(74) *Attorney, Agent, or Firm* — Hamre, Schumann, Mueller & Larson, P.C.

(57) ABSTRACT

A HVAC system for a vehicle that includes a propulsion system, a frame, a passenger compartment, and a door coupled to the frame. The HVAC system includes a refrigeration circuit that selectively controls the temperature of the passenger compartment based on a sensed temperature within the passenger compartment. The refrigeration circuit includes an exterior heat exchanger, a first air moving device coupled to the exterior heat exchanger, an interior heat exchanger, a second air moving device coupled to the interior heat exchanger, and a compressor. The HVAC system also includes a controller that is operable to detect a condition of the vehicle that includes at least one of a position of the door, a location of the vehicle, and a load of the propulsion system. The controller is programmed to adjust the refrigeration circuit in response to the sensed passenger compartment temperature and the detected vehicle condition.

24 Claims, 3 Drawing Sheets

Related U.S. Application Data continuation of application No. 11/942,980, filed on Nov. 20, 2007, now Pat. No. 7,900,462.

(52) U.S. Cl.
CPC ..... *B60H 1/00371* (2013.01); *B60H 1/00507* (2013.01); *B60H 1/00764* (2013.01); *B60H 1/00771* (2013.01); *B60H 1/00828* (2013.01); *B60H 1/00864* (2013.01); *B60H 1/3208* (2013.01); *B60H 2001/006* (2013.01); *B60H 2001/3266* (2013.01); *B60H 2001/3272* (2013.01)

(58) Field of Classification Search
USPC ........................................................ 165/202
See application file for complete search history.

(56) References Cited

U.S. PATENT DOCUMENTS

| | | |
|---|---|---|
| 4,412,425 A | 11/1983 | Fukami et al. |
| 4,823,555 A | 4/1989 | Ohkumo |
| 4,989,499 A | 2/1991 | Scoccia et al. |
| 5,186,015 A | 2/1993 | Roehrich et al. |
| 5,199,846 A | 4/1993 | Fukasaku et al. |
| 5,253,486 A | 10/1993 | Sugahara et al. |
| 5,261,856 A | 11/1993 | Walser |
| 5,572,881 A | 11/1996 | Hotta et al. |
| 5,983,649 A | 11/1999 | Aislabie et al. |
| 6,105,666 A | 8/2000 | Tajima et al. |
| 6,234,398 B1 | 5/2001 | Pawlak, III et al. |
| 6,290,140 B1 | 9/2001 | Pesko et al. |
| 6,341,494 B1 | 1/2002 | Isobe et al. |
| 6,560,980 B2 | 5/2003 | Gustafson et al. |
| 6,823,681 B2 | 11/2004 | Hirose et al. |
| 6,883,340 B2 | 4/2005 | Hirose et al. |
| 7,024,871 B2 | 4/2006 | Zhu et al. |
| 7,039,539 B2 | 5/2006 | Espinoza-Ibarra |
| 7,048,036 B2 | 5/2006 | Han |
| 7,096,680 B2 | 8/2006 | Sugesawa et al. |
| 7,275,378 B2 | 10/2007 | Errington et al. |
| 7,348,741 B2 | 3/2008 | Minekawa et al. |
| 7,539,565 B2 | 5/2009 | McBride et al. |
| 7,900,462 B2* | 3/2011 | Hegar ................ B60H 1/00371 236/51 |
| 8,011,199 B1* | 9/2011 | Chen .................... F25B 49/022 62/157 |
| 2001/0005991 A1 | 7/2001 | Niimi et al. |
| 2002/0134093 A1 | 9/2002 | Aoki et al. |
| 2002/0163198 A1 | 11/2002 | Gee |
| 2003/0018415 A1 | 1/2003 | Sonobe et al. |
| 2003/0172883 A1 | 9/2003 | Shiozaki et al. |
| 2004/0250560 A1 | 12/2004 | Ikura et al. |
| 2005/0086953 A1 | 4/2005 | Sugesawa et al. |
| 2005/0132727 A1 | 6/2005 | Zhu et al. |
| 2005/0192724 A1 | 9/2005 | Hendry |
| 2005/0223725 A1 | 10/2005 | Crane et al. |
| 2005/0230096 A1 | 10/2005 | Yamaoka |
| 2006/0005552 A1 | 1/2006 | Anyoji et al. |
| 2007/0131782 A1 | 6/2007 | Ziehr et al. |
| 2007/0261648 A1 | 11/2007 | Reckels et al. |
| 2010/0247339 A1* | 9/2010 | Lagemann ............ F24F 13/24 417/312 |

FOREIGN PATENT DOCUMENTS

| | | |
|---|---|---|
| DE | 19911414 | 6/2000 |
| EP | 1512601 | 3/2005 |
| EP | 1818238 | 8/2007 |
| JP | S61160317 | 7/1986 |
| JP | 07032868 | 2/1995 |
| JP | 08295131 | 11/1996 |
| JP | 2005306051 | 11/2005 |
| JP | 2006224827 | 8/2006 |

OTHER PUBLICATIONS

Search Report from the European Patent Office for European Application No. EP 13 19 4460 dated Jan. 23, 2014 (8 pages).

* cited by examiner

EXTERNAL NOISE REDUCTION OF HVAC SYSTEM FOR A VEHICLE

BACKGROUND

The present invention relates to a heating, ventilation, and air conditioning ("HVAC") system for a vehicle. More particularly, the present invention relates to a HVAC system that includes a refrigeration circuit and a controller programmed to adjust the refrigeration circuit based on a condition of a vehicle.

Generally, vehicle HVAC systems include a condenser or gas cooler, a compressor, an evaporator, and one or more fans that direct air across the condenser or gas cooler and/or the evaporator. Often, the main source of external noise for HVAC systems is generated by operation of the fans. External noise generated by the fans, or other components of the HVAC system, is most noticeable when the vehicle is stationary and an engine of the vehicle is idling.

SUMMARY

In one embodiment, the invention provides an air conditioning system for a vehicle that includes a propulsion system, a frame, a passenger compartment, and a door coupled to the frame. The air conditioning system includes a refrigeration circuit and a controller. The refrigeration circuit is operable to selectively control the temperature of the passenger compartment based on a sensed temperature within the passenger compartment. The refrigeration circuit includes an exterior heat exchanger that is supported by the frame, a first air moving device that is coupled to the exterior heat exchanger for directing air across the exterior heat exchanger, an interior heat exchanger supported by the frame and in fluid communication with the exterior heat exchanger, a second air moving device coupled to the interior heat exchanger for directing air across the interior heat exchanger, and a compressor supported by the frame and in fluid communication with the exterior heat exchanger and the interior heat exchanger. The controller is operable to detect a condition of the vehicle that includes at least one of a position of the door, a location of the vehicle, and a load of the propulsion system. The controller is in communication with the refrigeration circuit to adjust the refrigeration circuit in response to the sensed temperature within the passenger compartment and the detected condition of the vehicle.

In another embodiment, the invention provides a vehicle that includes a frame, a propulsion system coupled to the frame, a passenger compartment, a door coupled to the frame and movable between an open position and a closed position to selectively allow access to the passenger compartment, and an air conditioning system. The air conditioning system is operable in a first mode and a second mode that is quieter than the first mode, and includes a refrigeration circuit that is operable to selectively control the temperature within the passenger compartment based on the sensed temperature within the passenger compartment. The vehicle also includes a sensor that senses a condition of the vehicle that includes at least one of a position of the door, a location of the vehicle, and a load of the propulsion system. The sensor also generates a signal indicative of the vehicle condition. A controller is disposed in the vehicle and is in communication with the air conditioning system to regulate operation of the refrigeration circuit in response to the sensed temperature of the passenger compartment. The controller is further in communication with the sensor to receive the signal indicative of the vehicle condition and to selectively vary the air conditioning system between the first mode and the second mode in response to the signal indicative of the vehicle condition.

In yet another embodiment, the invention provides a method of operating a vehicle. The method includes providing a passenger compartment and an air conditioning system that has a refrigeration circuit in the vehicle. The refrigeration circuit is operable to control the temperature within the passenger compartment based on a sensed temperature within the passenger compartment. The method also includes initiating the air conditioning system and selectively conditioning the passenger compartment using the refrigeration circuit based on the sensed temperature within the passenger compartment, sensing a condition of the vehicle that includes at least one of a position of a door of the vehicle, a location of the vehicle, and a load of a propulsion system of the vehicle, and decreasing a speed of the refrigeration circuit in response to the vehicle condition.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
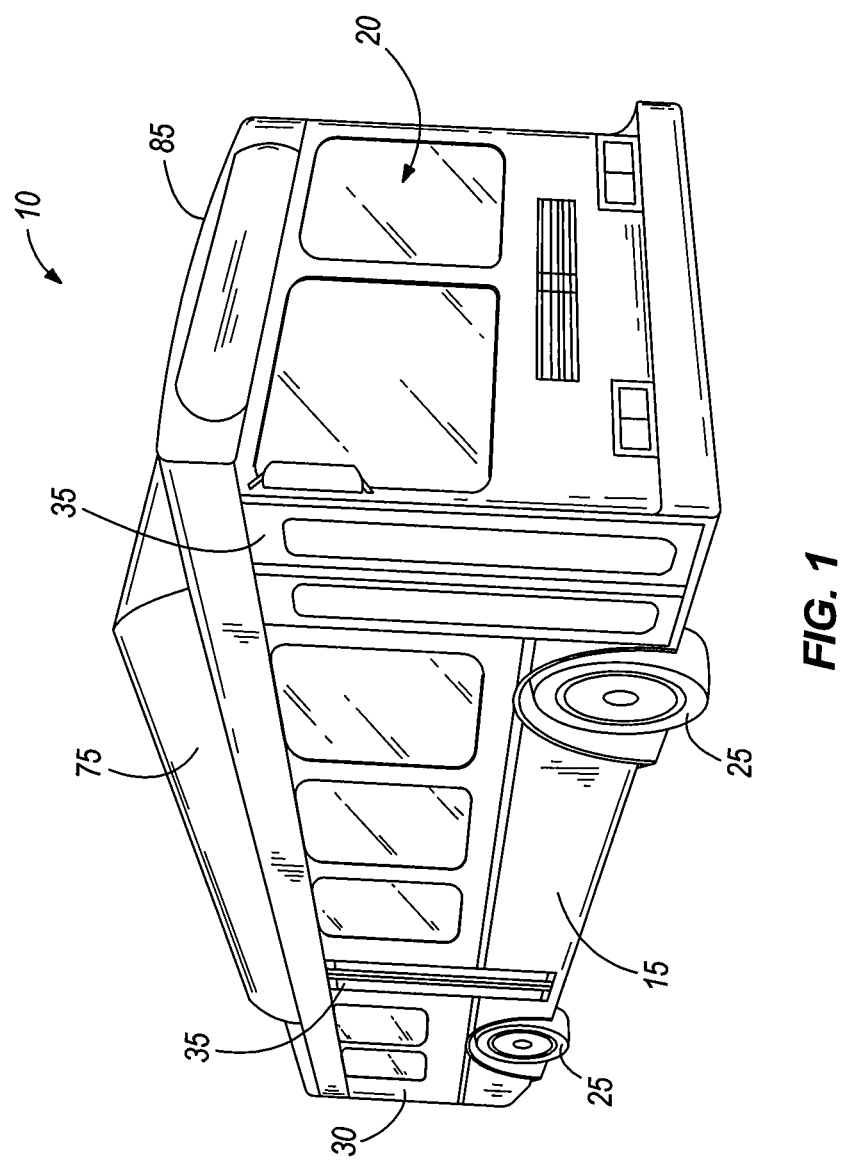
FIG. 1 is a perspective view of vehicle including a heating, ventilation, and air conditioning ("HVAC") system embodying the present invention.

FIG. 1 shows an exemplary vehicle 10. In the embodiment illustrated in FIG. 1, the vehicle 10 is a mass-transit bus that carries passengers (not shown) to one or more destinations. In other embodiments, the vehicle 10 can be a school bus or other commercial vehicle that carries passengers. Hereinafter, the term "vehicle" shall be used to represent all such passenger vehicles, and shall not be construed to limit the scope of the invention solely to mass-transit buses.

Figure 2:
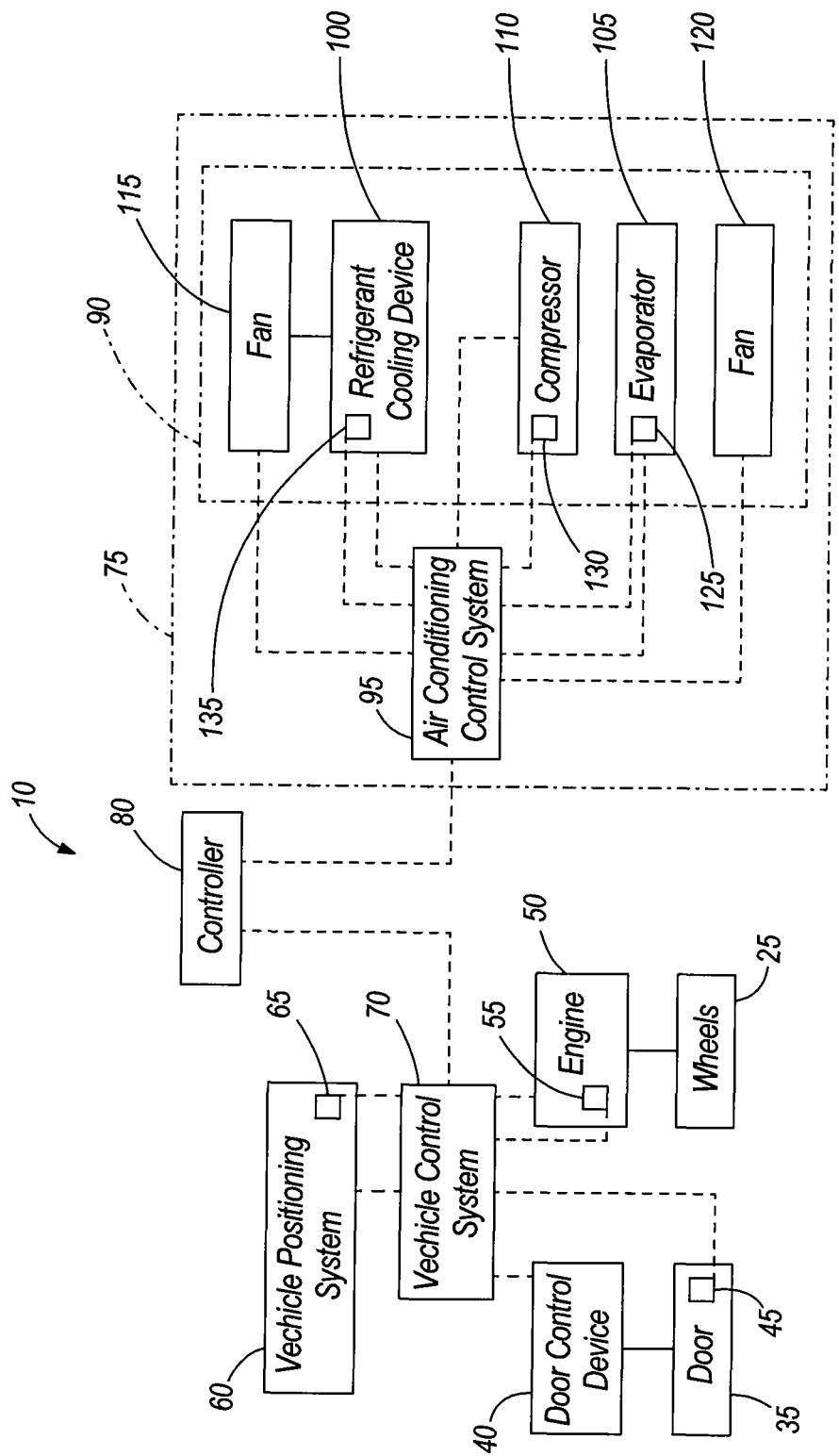
FIG. 2 is a schematic view of the HVAC system of FIG. 1.

FIGS. 1 and 2 show that the vehicle 10 includes a frame 15, a passenger compartment 20 supported by the frame 15, wheels 25, and a compartment 30. The frame 15 includes doors 35 that are positioned on a side of the vehicle 10. As shown in FIG. 1, a first door 35 is located adjacent to a forward end of the vehicle 10, and a second door 35 is positioned on the frame 15 toward a rearward end of the vehicle 10. Each door 35 is movable between an open position and a closed position to selectively allow access to the passenger compartment 20.

As shown in FIG. 2, the vehicle 10 includes a door control device 40 that is coupled to each door 35 (only one shown). The door control device 40 is operable to move the doors 35 between the respective open positions and closed positions. In some embodiments, the door control device 40 is manually operated by an operator of the vehicle 10 to open and close the doors 35. In other embodiments, the door control device 40 can automatically open and close the doors 35 (e.g., via electronic signals, etc.). In still other embodiments, one door control device 40 can be provided for each door 35 of the vehicle 10 to independently open and close each door 35.

A door sensor 45 is coupled to each door 35 to sense when one or all doors 35 are in the open position, and to generate a signal indicative of the respective positions of the doors 35. For example, the door sensor 45 can generate a first signal indicative of one or all doors 35 in the open position, and can generate a second signal indicative of the doors 35 in the closed position.

Alternatively, no signal may be affirmatively generated by the door sensor 45 when the doors 35 are in the closed position (i.e., the sensor is "silent" when the doors 35 are in the closed position). However, the silence of the door sensor 45 when the doors 35 are closed can be indicative of the doors 35 in the closed position. In some embodiments, one door sensor 45 may be coupled to both or all doors 35. In other embodiments, a door sensor 45 may be provided for each door 35 to independently sense the position of the respective door 35.

The compartment 30 is located adjacent the rear end of the vehicle 10 (FIG. 1), and includes a propulsion system 50 that is coupled to the frame 15 to drive the wheels 25. In some embodiments, the compartment 30 can be located in other locations on the vehicle 10 (e.g., adjacent the forward end, etc.).

The propulsion system 50 (e.g., prime mover, engine, etc.) can be an internal combustion engine, or alternatively, a hybrid engine that includes an electrical power system coupled to an internal combustion engine. In other embodiments, the propulsion system 50 can be a fully electrical power system (e.g., battery assembly) without a corresponding internal combustion engine. Hereinafter, the term "propulsion system" shall be used to represent all such propulsion systems, and shall not be construed to limit the scope of the invention solely to internal combustion engines.

Generally, the propulsion system 50 provides most, if not all of the power to vehicle components and accessories, in addition to powering the wheels 25, and includes an "off" state and an "on" state. Generally, the vehicle 10 is operable at one or more speeds, and the propulsion system 50 is the main driving component or mechanism for the speed that the vehicle 10 travels. The propulsion system 50 is further operable at relatively high loads and relatively low loads. The load that the propulsion system 50 is under is defined by the amount of work per time unit that must be provided by the propulsion system 50 to move and operate the vehicle 10. In other words, the load of the propulsion system 50 is defined by the amount of output power that must be provided by the propulsion system 50 to move and operate the vehicle 10. For example, the propulsion system 50 is under relatively high loads when the vehicle 10 is moving uphill or over rough terrain. The propulsion system 50 is under relatively low loads when the vehicle 10 is moving downhill, when the vehicle 10 is moving over relatively flat terrain, or when the propulsion system 50 is idling. Generally, a change in the load of the propulsion system 50 can be indicated by a change in the output power of the propulsion system 50 that is measured, for example, in kilowatts or horsepower.

A sensor 55 is coupled to the propulsion system 50 to sense a condition of the propulsion system 50, and to generate a signal indicative of the propulsion system condition. In some embodiments, the sensor 55 is configured to detect the load under which the propulsion system 50 is operating. In these embodiments, the sensor 55 generates a signal indicative of the propulsion system load. In other embodiments, the sensor 55 is configured to detect startup of the propulsion system 50 from the "off" state.

With continued reference to FIG. 2, the vehicle 10 also includes a vehicle positioning system 60 that is operable to detect a position or location of the vehicle 10. Generally, the vehicle positioning system 60 includes a vehicle position sensor 65 that determines the position of the vehicle 10 relative to an object or freestanding structure (e.g., a building, a bus-stop, etc.). The vehicle position sensor 65 is operable to determine the proximity or distance of the vehicle 10 to the freestanding structure, and is further operable to generate a signal indicative of the proximity of the vehicle 10 relative to the freestanding structure. In some embodiments, the vehicle position sensor 65 can be a global positioning system sensor in communication with a global positioning system (not shown) that determines the location of the vehicle 10 relative to a freestanding structure. The vehicle positioning system 60 may also be used to determine the location of the vehicle 10 independent of the proximity of the vehicle 10 to a freestanding structure.

The vehicle 10 also includes a vehicle control system 70, a heating, ventilation, and air conditioning ("HVAC") system 75, and an interface or controller 80 in communication with the vehicle control system 70 and the HVAC system 75. The vehicle control system 70 can be located anywhere on the vehicle 10, and is in communication electrical and/or mechanical components (not shown) of the vehicle 10. The vehicle control system 70 is also in communication with the door control device 40, the propulsion system 50, and the vehicle positioning system 60 to receive the respective signals from the door sensor 45, the sensor 55, and the vehicle position sensor 65. Generally, the positions of the doors 35, the condition of the propulsion system 50, and the proximity of the vehicle 10 relative to a freestanding structure are defined as conditions of the vehicle 10. In some embodiments, additional vehicle conditions of the vehicle 10 may also be sensed by one or more sensors.

FIG. 1 shows that the HVAC system 75 is attached to the frame 15 on a roof 85 of the vehicle 10. FIG. 2 shows that the HVAC system 75 includes a refrigeration circuit 90 and an HVAC control system 95. The refrigeration circuit 90 is operable at various capacities, ranging from a zero capacity in an "off" state to a full capacity in an "on" state. The capacity of the refrigeration circuit 90 is the capacity at which the refrigeration circuit 90 is able to cool air that enters the passenger compartment 20.

A full capacity of the refrigeration circuit 90 corresponds to a first or normal mode of the HVAC system 75, and a reduced capacity (i.e., a capacity that is less than full capacity) of the refrigeration circuit 90 corresponds to a second or reduced noise mode of the HVAC system 75. Generally, the speed of one or more HVAC system components in the second mode are slower than the speed of the same components in the first mode, and operation of the HVAC system 75 in the second mode reduces perceived noise that emanates from the HVAC system 75. For example, when the HVAC system 75 operates at full capacity (i.e., in the first mode), the refrigeration circuit 90 operates at a speed that is generally necessary to maintain a predetermined temperature within the passenger compartment 20. When the HVAC system 75 operates at a reduced capacity (i.e., in the second mode), the refrigeration circuit 90 operates at a speed that is slower than the necessary speed to maintain the predetermined temperature of the passenger compartment 20. The HVAC system 75 is generally operable in the second mode only for a limited time based on the sensed vehicle conditions.

The first mode is indicative of a first, normal noise level of the HVAC system 75 that is based on noise produced by one or more of the refrigeration components. The second mode is indicative of a second, reduced noise level of the HVAC system 75. Thus, operation of the HVAC system 75 in the second mode is quieter than operation in the first mode, and which corresponds to reduced noise operation of the HVAC system 75. In other words, when the capacity of the refrigeration circuit 90 is reduced, the sound emitted by the HVAC system 75 is likewise reduced.

The refrigeration circuit 90 is a vehicle HVAC circuit that is operable to control a temperature of the passenger compartment 20 based on the temperature that is sensed within the passenger compartment 20 by one or more sensors (not shown). The refrigeration circuit includes an exterior heat exchanger 100, an interior heat exchanger 105, a compressor 110, a first air moving device 115, and a second air moving device 120. In the illustrated embodiment, the first and second air moving devices 115, 120 are fans. The refrigeration circuit 90 may also include additional components (not shown). A refrigerant flows through the refrigeration components to provide temperature-controlled air to the passenger compartment 20.

The speed of the refrigeration circuit 90 is defined as the speed of refrigerant flow through the exterior heat exchanger 100 and/or the interior heat exchanger 105. The speed of the refrigeration circuit 90 can be also defined as the speed of the compressor 110, the speed of the first air moving device 115, and/or the speed of the second air moving device 120, in addition to the speed of other components of the refrigeration circuit 90.

In some constructions, the exterior heat exchanger 100 cools heated refrigerant that flows from the compressor 110 in a cooling mode of the refrigeration circuit 90. The exterior heat exchanger 100 may include a gas cooler, or alternatively a condenser, depending on the type of refrigerant routed through the refrigeration circuit 90. In other constructions, the exterior heat exchanger 100 heats cooled refrigerant in a heating mode of the refrigeration circuit 90.

Although not shown, the interior heat exchanger 105 (e.g., evaporator, etc.) is in fluid communication with the exterior heat exchanger 100 to receive cooled refrigerant and to transfer heat from air passing over the interior heat exchanger 105 to the refrigerant prior to the air entering the passenger compartment 20. The compressor 110 is in fluid communication with the exterior heat exchanger 100 and the interior heat exchanger 105 to compress heated refrigerant received from the interior heat exchanger 105 and to provide refrigerant flow throughout the refrigeration circuit 90. The speed of the compressor 110 is variable based in part on a desired pressure of the refrigerant within the refrigeration circuit 90.

Generally, the first and second air moving devices 115, 120 include fans or blowers that direct airflow across one or more components of the refrigeration circuit 90. The first air moving device 115 is coupled to the exterior heat exchanger 100, and the speed of the first air moving device 115 is variable based on desired airflow across the exterior heat exchanger 100. The first air moving device 115 generally directs air across the exterior heat exchanger 100 to cool heated, compressed refrigerant that flows from the compressor 110.

The second air moving device 120 is coupled to the interior heat exchanger 105, and the speed of the second air moving device 120 is variable based on desired airflow across the interior heat exchanger 105. The second air moving device 120 generally directs air across the interior heat exchanger 105 to cool air entering the passenger compartment 20 via heat transfer with cool refrigerant flowing through the interior heat exchanger 105.

The HVAC control system 95 is in communication with the compressor 110 to control compressor capacity, and is in communication with the first and second air moving devices 115, 120 to control the speed of the first and second air moving devices 115, 120. The HVAC control system 95 is operable to vary the refrigeration circuit 90 between an "off" state and an "on" state, and to further control the capacity of the refrigeration circuit 90 based in part on the desired temperature of the passenger compartment 20, and further based on ambient conditions adjacent to the HVAC system 75.

The HVAC control system 95 is also in communication with an evaporator sensor 125, a compressor sensor 130, and a refrigerant cooling device sensor 135. The HVAC control system 95 may also be in communication with other sensors (not shown) that are coupled to components of the refrigeration circuit 90. The evaporator sensor 125 is coupled to the interior heat exchanger 105 to sense a temperature of the refrigerant flowing through the interior heat exchanger 105, and to generate a signal indicative of the refrigerant temperature. In other embodiments, the evaporator sensor can sense the temperature of air flowing over the interior heat exchanger 105. In still other embodiments, the evaporator can sense a pressure of refrigerant that flows through the interior heat exchanger 105.

The compressor sensor 130 is coupled to the compressor 110 to sense a pressure of refrigerant that flows through the compressor 110. In some embodiments, the compressor sensor 130 can monitor the pressure of the refrigerant that enters the compressor 110 (i.e., the suction pressure). In other embodiments, the compressor sensor 130 can monitor the pressure of refrigerant that exits the compressor 110 (i.e., the discharge pressure). In still other embodiments, the compressor sensor 130 may be configured to sense the discharge pressure and the suction pressure of the refrigerant flowing through the compressor 110.

The refrigerant cooling device sensor 135 is coupled to the exterior heat exchanger 100 to sense a temperature of refrigerant exiting the exterior heat exchanger 100, and to generate a signal indicative of the sensed temperature. In some embodiments, the refrigerant cooling device sensor 135 can be located in a refrigeration line (not shown) that is proximate to and downstream of the exterior heat exchanger 100.

The controller 80 is disposed in the vehicle 10, and generally can be located anywhere on the vehicle 10. The controller 80 is in communication with the vehicle control system 70 and the HVAC system 75 to monitor conditions of the vehicle 10 and the HVAC system 75, and to control the HVAC system 75 in response to the sensed temperature within the passenger compartment 20 and the sensed vehicle conditions. In some embodiments, the controller 80 can be a stand-alone controller 80 in addition to the vehicle control system 70 and the HVAC control system 95. In other embodiments, the vehicle control system 70 and/or the HVAC control system 95 can be a part of or subsumed in the controller 80.

The vehicle conditions sensed by the door sensor 45, the sensor 55, and the vehicle position sensor 65 are communicated to the controller 80 via the vehicle control system 70 to enable the controller 80 to selectively vary the HVAC system 75 between the first mode and the second mode via the HVAC control system 95. The conditions of the refrigeration circuit 90 sensed by the evaporator sensor 125, the compressor sensor 130, and the refrigerant cooling device sensor 135 are communicated to the controller 80 via the HVAC control system 95 to enable the controller 80 to monitor the conditions and capacity of the refrigeration circuit 90.

In operation, the controller 80 receives the signals indicative of the vehicle conditions and the signals indicative of the conditions of the refrigeration circuit 90 from the respective sensors, and monitors and controls the HVAC system 75 based on these signals. The controller 80 operates the HVAC system 75 in the second mode when the sensed vehicle conditions indicate that the vehicle 10 is stopped, the propulsion system 50 is operating under a relatively high load, and/or the vehicle 10 is located in close proximity to a freestanding structure.

The proximity of the vehicle 10 relative to the freestanding structure is determined by the vehicle positioning system 60, and is communicated to the controller 80 via the vehicle control system 70. Generally, the proximity of the vehicle 10 relative to the freestanding structure is based on the distance between the vehicle 10 and the freestanding structure. The vehicle position sensor 65 detects the position of the vehicle 10 and generates a signal that is indicative of the proximity of the vehicle 10 relative to the freestanding structure. When the distance between the vehicle 10 and the freestanding structure is less than or equal to a predetermined distance (e.g., 10 meters, 50 meters, etc.), the controller 80 determines that the vehicle 10 is in close proximity to the freestanding structure. When the distance between the vehicle 10 and the freestanding structure is greater than the predetermined distance, the controller 80 determines that the vehicle 10 is not in close proximity to the freestanding structure and is located away from the structure.

In some embodiments, the vehicle 10 may be considered in close proximity to the freestanding structure based on the distance between the vehicle 10 and the freestanding structure, and further based on the time period that the vehicle 10 is located at a distance that is less than or equal to the predetermined distance from the freestanding structure. In other embodiments, the controller 80 may determine that the vehicle 10 is in close proximity to the freestanding structure when the distance between the vehicle 10 and the freestanding structure is less than the predetermined distance, and that the vehicle is not in close proximity when the distance is greater than or equal to the predetermined distance.

Figure 3:
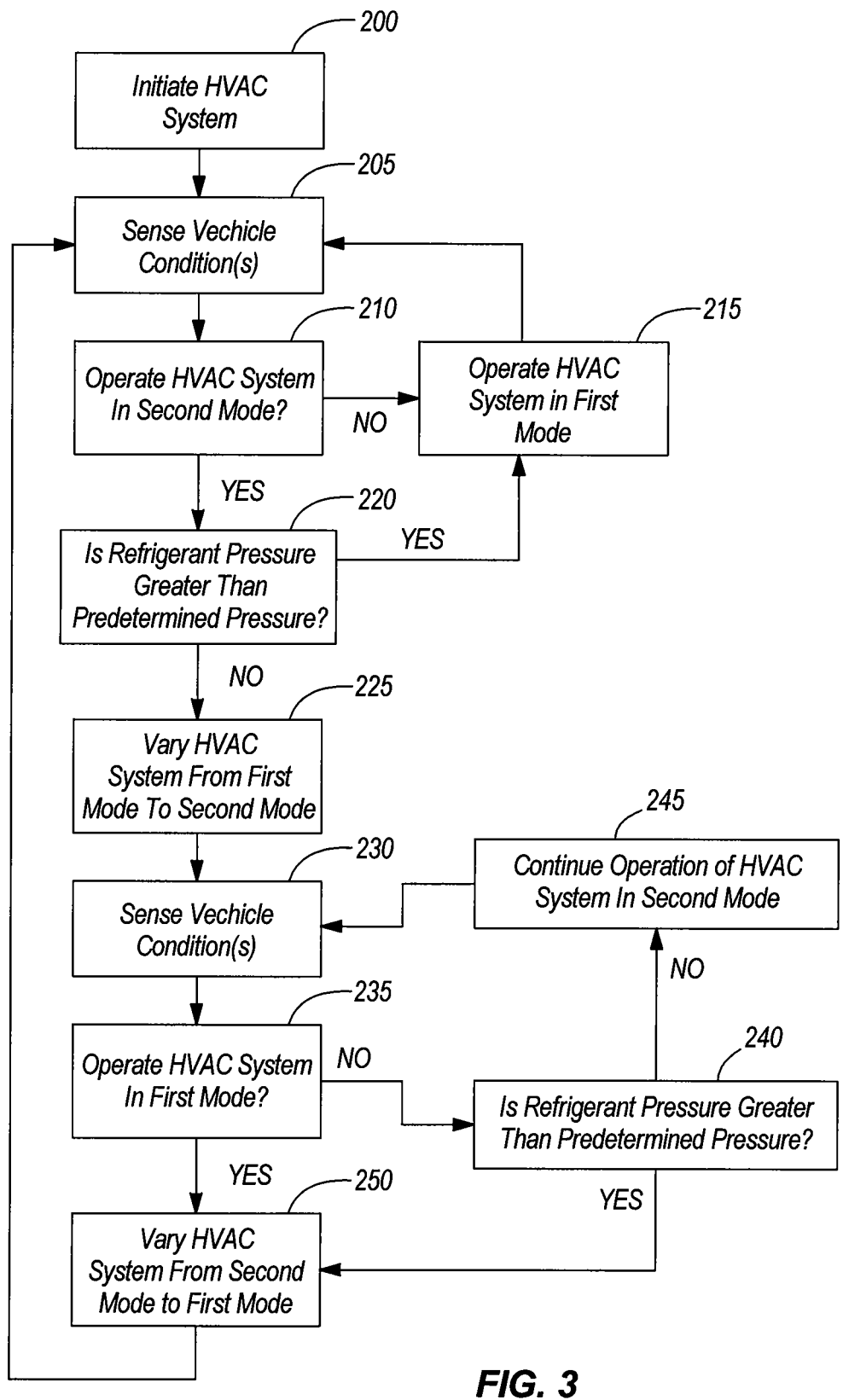
FIG. 3 is a flow chart diagram of the operation of one embodiment of the HVAC system.

FIG. 3 shows one embodiment of operation of the vehicle 10 using the controller 80. The controller 80 initiates the HVAC system 75 at step 200 after the propulsion system 50 has been started. In some embodiments, the HVAC system 75 may be self-initiated by the HVAC control system 95 after startup of the propulsion system 50. After initiation, the HVAC system 75 is operated in the first mode. The flow of refrigerant through the refrigeration circuit 90 and the capacity of the refrigeration circuit 90 can be controlled by the controller 80 and/or the HVAC control system 95 based on the signals received from the evaporator sensor 125, the compressor sensor 130, and the refrigerant cooling device sensor 135, and further based on the signals indicative of the vehicle conditions (e.g., sensed temperature) and the desired conditions (e.g., desired temperature) of the passenger compartment 20.

At step 205, the vehicle conditions are sensed by the door sensor 45, the sensor 55, and the vehicle position sensor 65. The controller 80 receives the signals indicative of the respective vehicle conditions that are generated by the sensors 45, 55, 65. At step 210, the controller 80 determines whether the HVAC system 75 should be operated in the second mode. Generally, the signals received by the controller 80 indicating that the HVAC system 75 should be operated in the second mode (e.g., one or more doors 35 are open, the vehicle 10 is located in close proximity to a freestanding structure, the propulsion system 50 is operating under a relatively high load, the vehicle is moving at a relatively slow speed, etc.) are signals indicative of a first vehicle condition. The signals received by the controller 80 indicating that the HVAC system 75 should be operated in the first mode (e.g., the doors 35 are closed, the vehicle is a predetermined distance from the freestanding structure, the propulsion system 50 is operating under a relatively low load, etc.) are generally signals indicative of a second vehicle condition.

At step 215, the HVAC system 75 continues to be operated in the first mode by the controller 80 when all of the sensed vehicle conditions are indicative of a second vehicle condition (i.e., "No" at step 210). Operation of the vehicle 10 then returns to step 205.

At step 220, the controller 80 determines whether the refrigerant pressure (e.g., the discharge pressure, the suction pressure) sensed by the compressor sensor 130 is greater than a predetermined pressure when one or more of the sensed vehicle conditions indicate that the HVAC system 75 should be operated in the second mode (i.e., "Yes" at step 210). If the refrigerant pressure sensed by the compressor sensor 130 is greater than the predetermined pressure (i.e., "Yes" at step 220), operation of the HVAC system 75 returns to step 215 and the controller 80 continues to operate the HVAC system 75 in the first mode regardless of the sensed vehicle conditions. In some embodiments, the HVAC system 75 can continue to be operated in the first mode when the refrigerant discharge pressure is equal to or greater than the predetermined pressure.

Generally, the controller 80 monitors the sensed refrigerant pressure to provide an override control to operation of the HVAC system 75 in the second mode. The controller 80 overrides the signals that indicate the HVAC system 75 should be operated in the second mode when the signal from the compressor sensor 130 indicates that the refrigerant pressure exceeds the predetermined pressure. This override protects the structural integrity of the refrigeration circuit 90 and prevents conditions in the passenger compartment 20 from becoming undesirable.

If the refrigerant pressure sensed by the compressor sensor 130 at step 220 is less than or equal to the predetermined pressure (i.e., "No" at step 220), the controller 80 varies the HVAC system 75 from the first mode to the second mode at step 225 to decrease the speed of the refrigeration circuit 90 such that the noise output of the HVAC system 75 is reduced. The speed of the refrigeration circuit 90 is decreased by decreasing the speed of one or more of the refrigeration components (e.g., the compressor 110, the first air moving device 115, the second air moving device 120, etc.).

In some embodiments, the controller 80 decreases the speed of the compressor 110, the first air moving device 115, or the second air moving device 120 in response to the vehicle conditions indicating that the HVAC system 75 should be operated in the second mode. For example, the controller 80 can be programmed to decrease the speed of the first air moving device 115 to reduce the noise output of the HVAC system 75 without decreasing the speed of the compressor 110 or the second air moving device 120. Similarly, the controller 80 may be programmed to decrease the speed of the compressor 110, or alternatively the second air moving device 120, to reduce the noise output of the HVAC system 75 without decreasing the speed of the other refrigeration components.

In other embodiments, the controller 80 may decrease the speed of the compressor 110, the first air moving device 115, and the second air moving device 120 (i.e., all three components) to reduce the noise output of the HVAC system 75. In still other embodiments, the controller 80 may be programmed to decrease the speed of the compressor 110, the first air moving device 115, and/or the second air moving device 120. For example, the controller 80 may decrease the speed of the first air moving device 115 and the second air moving device 120, but not the speed of the compressor 110. Instead, the controller 80 may decrease the speed of the compressor 110 and the first air moving device 115, but not the speed of the second air moving device 120. Similarly, the controller 80 may decrease the speed of the compressor 110 and the second air moving device 120 without decreasing the speed of the first air moving device 115. Generally, the controller 80 can be programmed to decrease the speed of any combination of the compressor 110, the first air moving device 115, and the second air moving device 120 to facilitate a reduction of noise output by the HVAC system 75. In other embodiments, the controller 80 may be programmed to decrease the speed of other components of the refrigeration circuit 90.

At step 230, the vehicle conditions are again sensed by the door sensor 45, the sensor 55, and the vehicle position sensor 65. The signals indicative of the respective vehicle conditions are received by the controller 80, which determines at step 235 whether all of the sensed vehicle conditions indicate that the HVAC system 75 should be operated in the first mode. If one or more of the vehicle conditions indicate that the HVAC system 75 should continue to operate in the second mode (i.e., "No" at step 235), the controller 80 again determines whether the refrigerant pressure sensed by the compressor sensor 130 is greater than the predetermined pressure at step 240.

At step 245, the HVAC system 75 continues to be operated by the controller 80 in the second mode when the refrigerant pressure sensed by the compressor sensor 130 is less than or equal to the predetermined pressure (i.e., "No" at step 240). The refrigeration circuit 90 continues to be operated at the decreased speed such that the noise output of the HVAC system 75 is continues to be quieter than the noise output when the HVAC system 75 is operated in the first mode. Operation of the vehicle 10 then returns to step 230.

If the refrigerant pressure sensed by the compressor sensor 130 is greater than the predetermined pressure (i.e., "Yes" at step 240), the controller 80 varies the HVAC system 75 from the second mode to the first mode at step 250 to increase the speed of the refrigeration circuit 90 to a full capacity speed. The speed of the refrigeration circuit 90 is increased by increasing the speed of one or more of the refrigeration components (e.g., the compressor 110, the first air moving device 115, the second air moving device 120, etc.). In some embodiments, the HVAC system 75 can be varied to operation in the first mode when the refrigerant discharge pressure is equal to or greater than the predetermined pressure.

When all of the sensed vehicle conditions indicate that the HVAC system 75 should be operated in the first mode (i.e., "Yes" at step 235), the controller 80 varies the HVAC system 75 from the second mode to the first mode at step 250. The switching of the HVAC system 75 from the second mode to the first mode increases the speed of the refrigeration circuit 90. The increased speed of the refrigeration circuit 90, relative to the speed at which the refrigeration circuit 90 had been operating with the HVAC system 75 in the second mode, allows the HVAC system 75 to operate at full capacity. In some embodiments, the controller 80 may initiate a predetermined delay in response to the sensed vehicle condition and prior to varying the HVAC system 75 from the second mode to the first mode. Generally, the speed of the refrigeration circuit 90 is increased by increasing the speed of the refrigeration component or components that were previously operated at a decreased speed.

For example, if the speed of the compressor 110 was previously decreased such that the HVAC system 75 is operating in the second mode, varying the HVAC system 75 from the second mode to the first mode increases the speed of the compressor 110. If the speed of the first air moving device 115 had been previously decreased, varying the HVAC system 75 from the second mode to the first mode increases the speed of the first air moving device 115. If the speed of the second air moving device 120 had been previously decreased, varying the HVAC system 75 from the second mode to the first mode increases the speed of the second air moving device 120. If the speed of two or more components (e.g., the compressor 110 and the first air moving device 115, etc.) had been previously decreased, varying the HVAC system 75 from the second mode to the first mode increases the speed of these components.

In some embodiments, each signal indicative of a vehicle condition is independent from the remaining signals indicative of the vehicle conditions such that the controller 80 selectively operates the HVAC system 75 in the second mode in response to one vehicle condition regardless or independent of the other sensed vehicle conditions. Generally, when the respective independent signal indicative of the first vehicle condition has been generated (e.g., one or more of the doors 35 are in the open position, the vehicle 10 is located in close proximity to a freestanding structure, the propulsion system 50 is under a high load, or the vehicle 10 is operating at a relatively slow speed, etc.), the controller 80 varies the HVAC system 75 from the first mode to the second mode regardless of other signals. When the respective independent signal indicative of the first vehicle condition has cleared (e.g., the doors 35 are closed, the vehicle 10 is no longer located in close proximity to a freestanding structure, the propulsion system 50 is operating under a high load, or the vehicle 10 is operating at a relatively fast speed, etc.), the controller 80 varies the HVAC system 75 from the second mode to the first mode regardless of other signals. In other words, when the respective independent signal indicative of the second vehicle condition is generated, the controller 80 varies the HVAC system 75 from the second mode to the first mode regardless of other signals.

For example, when the door sensor 45 senses one door 35 in the open position (i.e., the first vehicle condition), the controller 80 can vary the HVAC system 75 from the first mode to the second mode. When the previously opened door 35 is sensed by the door sensor 45 in the closed position (i.e., the second vehicle condition), the door sensor 45 generates a signal indicative of the changed condition. The controller 80 receives the signal indicative of the door 35 in the closed position and can vary the HVAC system 75 from the second mode to the first mode regardless of the signals from the sensor 55 and the vehicle position sensor 65.

Likewise, the controller 80 can vary the HVAC system 75 from the first mode to the second mode independent of the signals from the door sensor 45 and the vehicle position sensor 65 when the sensor 55 senses that the propulsion system 50 has just been started or is operating under a high load, or that the vehicle 10 is operating at a relatively slow speed. The controller 80 can vary the HVAC system 75 from the second mode to the first mode regardless of other sensed vehicle conditions when the sensor 55 senses that propulsion system 50 has warmed up or is operating at a relatively low load, or the vehicle 10 is operating at a relatively fast speed.

With regard to sensing the location of the vehicle 10 using the vehicle position sensor 65, the controller 80 can vary the HVAC system 75 from the first mode to the second mode when the vehicle 10 is sensed to be in close proximity to a freestanding structure independent of the signals from the door sensor 45 and the sensor 55. The controller 80 can vary the HVAC system 75 from the second mode to the first mode regardless of other sensed vehicle conditions when the vehicle position sensor 65 senses that the vehicle 10 is no longer in close proximity to the freestanding structure.

In other embodiments, the signals indicative of the respective vehicle conditions work in combination with each other such that the controller 80 selectively varies the HVAC system 75 between the first mode and the second mode based on the various combinations of the signals. In these embodiments, when at least one sensor 45, 55, 65 senses a vehicle condition indicative of a first vehicle condition, the controller 80 varies the HVAC system 75 from the first mode to the second mode. Any combination of the signals indicative of the first vehicle condition cause the controller 80 to operate the HVAC system 75 in the second mode. Thus, if one, two, or more sensors detect a first vehicle condition, the HVAC system 75 is operated in the second mode. However, in these embodiments, the controller 80 does not vary the HVAC system 75 from the second mode to the first mode until all signals indicative of the first vehicle conditions have cleared (i.e., all sensors generate signals indicative of a second vehicle condition).

In still other embodiments, when two or more sensors 45, 55, 65 generate signals indicative of respective first vehicle conditions, the controller 80 can vary the HVAC system 75 from the first mode to the second mode. In these embodiments, the controller 80 can vary the HVAC system 75 from the second mode to the first mode when any or all of the signals indicative of the first vehicle condition have cleared. In other words, operation of the HVAC system 75 is changed from the second mode to the first mode when at least one of the sensors that previously generated a signal indicative of a first vehicle condition generates a signal indicative of a second vehicle condition.

In hybrid vehicle applications, the sensor 55 senses the load of the propulsion system 50 and the controller 80 determines whether the propulsion system load is above a predetermined value that corresponds to the power necessary for the vehicle 10 to adequately operate (e.g., move up a hill, etc.). When the propulsion system 50 needs additional power (e.g., from a battery pack, etc.) to facilitate adequate movement of the vehicle 10, the controller 80 can provide additional power to the propulsion system 50 by reducing power consumption of other components of the vehicle 10. For example, the controller 80 can decrease the speed of the refrigeration circuit 90 by operating the HVAC system 75 in the second mode, which decreases power consumption by the HVAC system 75 and allows a portion of the power originally supplied to the HVAC system 75 to be directed to the propulsion system 50 so that the propulsion system 50 has adequate power to operate. When the propulsion system 50 no longer needs the additional power, the controller 80 can direct the power back to the HVAC system 75 and operate the HVAC system 75 in the first mode.

Various features and advantages of the invention are set forth in the following claims.

What is claimed is:

1. A heating, ventilation, and air conditioning ("HVAC") system for a vehicle including a propulsion system, a frame, a passenger compartment, and a door coupled to the frame, the HVAC system comprising:
   a refrigeration circuit operable to selectively control the temperature of the passenger compartment based on a sensed temperature within the passenger compartment, the refrigeration circuit including
   an exterior heat exchanger supported by the frame,
   a first air moving device coupled to the exterior heat exchanger for directing air across the exterior heat exchanger,
   an interior heat exchanger supported by the frame and in fluid communication with the exterior heat exchanger,
   a second air moving device coupled to the interior heat exchanger for directing air across the interior heat exchanger, and
   a compressor supported by the frame and in fluid communication with the exterior heat exchanger and the interior heat exchanger; and
   a controller operable to detect a condition of the vehicle, the vehicle condition including at least one of a position of the door, a location of the vehicle, and a load of the propulsion system, the controller in communication with the refrigeration circuit and programmed to adjust the refrigeration circuit in response to the sensed temperature of the passenger compartment and the detected condition of the vehicle.

2. The HVAC system of claim 1, wherein the controller is programmed to decrease a speed of at least one of the first air moving device, the second air moving device, and the compressor in response to detection of a first condition of the vehicle, and wherein the controller is programmed to increase the speed of at least one of the first air moving device, the second air moving device, and the compressor that was previously operated at a decreased speed in response to detection of a second condition of the vehicle.

3. The HVAC system of claim 2, wherein the first vehicle condition includes the door detected in an open position, and wherein the second vehicle condition includes the door detected in a closed position.

4. The HVAC system of claim 2, wherein the first vehicle condition includes the location of the vehicle detected in close proximity with a freestanding structure, and wherein the second vehicle condition includes the location of the vehicle detected at least a predetermined distance from the freestanding structure.

5. The HVAC system of claim 2, wherein the first vehicle condition includes the propulsion system load detected above a first predetermined value, and wherein the second vehicle condition includes the propulsion system load detected below a second predetermined value.

6. The HVAC system of claim 2, wherein the controller is programmed to initiate a predetermined delay in response to the second vehicle condition and prior to increasing the speed of at least one of the first air moving device, the second air moving device, and the compressor that was previously operated at a decreased speed.

7. A vehicle comprising:
a frame;
a propulsion system coupled to the frame;
a passenger compartment;
a door coupled to the frame and movable between an open position and a closed position to selectively allow access to the passenger compartment;
a heating, ventilation, and air conditioning ("HVAC") system operable in a first mode and a second mode that is quieter than the first mode, the HVAC system including a refrigeration circuit operable to selectively control the temperature within the passenger compartment based on a sensed temperature within the passenger compartment;
a sensor configured to sense a condition of the vehicle and to generate a signal indicative of the vehicle condition, the vehicle condition including at least one of a position of the door, a location of the vehicle, and a load of the propulsion system; and
a controller disposed in the vehicle and in communication with the HVAC system to regulate operation of the refrigeration circuit in response to the sensed temperature of the passenger compartment, the controller further in communication with the sensor to receive the signal indicative of the vehicle condition and to selectively vary the HVAC system between the first mode and the second mode in response to the signal.

8. The vehicle of claim 7, wherein the sensor is in communication with the door to sense a position of the door and to generate a signal indicative of the door position, and wherein the controller is programmed to operate the HVAC system in the first mode in response to the signal indicative of the door in the closed position, and wherein the controller is programmed to operate the HVAC system in the second mode in response to the signal indicative of the door in the open position.

9. The vehicle of claim 7, wherein the location of the vehicle includes the proximity of the vehicle relative to a freestanding structure, and wherein the controller is programmed to operate the HVAC system in the second mode in response to the signal indicative of the location of the vehicle in close proximity with the freestanding structure.

10. The vehicle of claim 9, wherein the vehicle position sensor includes a global positioning system sensor.

11. The vehicle of claim 9, wherein the controller is programmed to operate the HVAC system in the first mode in response to the signal indicative of the location of the vehicle at least a predetermined distance from the freestanding structure.

12. The vehicle of claim 7, wherein the controller is programmed to initiate a predetermined delay in response to the vehicle condition and prior to varying operation of the HVAC system from the second mode to the first mode.

13. The vehicle of claim 7, wherein the controller is programmed to operate the HVAC system in the first mode regardless of the vehicle condition in response to a refrigerant pressure of the refrigerant circuit above a predetermined pressure.

14. The vehicle of claim 7, wherein the sensor is in communication with the propulsion system to sense a load of the propulsion system, and wherein the controller is programmed to operate the HVAC system in the second mode in response to the signal indicative of the propulsion system load above a first predetermined value.

15. The vehicle of claim 14, wherein the controller is programmed to operate the HVAC system in the first mode in response to the signal indicative of the propulsion system load below a second predetermined value.

16. A method of operating a vehicle, the method comprising:
providing a passenger compartment and a heating, ventilation, and air conditioning ("HVAC") system in the vehicle, the HVAC system including a refrigeration circuit operable to control the temperature within the passenger compartment based on a sensed temperature within the passenger compartment, the refrigeration circuit having a exterior heat exchanger, a first air moving device directing air across the exterior heat exchanger, interior heat exchanger, a second air moving device for directing air across the interior heat exchanger, and a compressor;
initiating the HVAC system and selectively conditioning the passenger compartment using the refrigeration circuit based on the sensed temperature within the passenger compartment;
sensing a condition of the vehicle including sensing at least one of a position of a door of the vehicle, a location of the vehicle, and a load of a propulsion system of the vehicle; and
adjusting the refrigeration circuit in response to the vehicle condition.

17. The method of claim 16, further comprising reducing a noise output of the HVAC system by decreasing a speed of the refrigeration circuit in response to the vehicle condition.

18. The method of claim 16, further comprising
sensing the door of the vehicle in an open position;
decreasing a speed of the refrigeration circuit in response to the door in the open position;
sensing the door in a closed position; and
increasing the speed of the refrigeration circuit in response to the door in the closed position.

19. The method of claim 16, further comprising
sensing the location of the vehicle relative to a freestanding structure;
decreasing a speed of the refrigeration circuit in response to the location of the vehicle in close proximity with the freestanding structure;
increasing the speed of the refrigeration circuit in response to the location of the vehicle at least a predetermined distance from the freestanding structure.

20. The method of claim 16, further comprising decreasing at least one of a speed of the first air moving device, the second air moving device, and the compressor in response to the vehicle condition.

21. The method of claim 16, further comprising
sensing a refrigerant pressure of the refrigeration circuit; and
operating the refrigeration circuit at a full capacity speed regardless of the vehicle condition in response to the refrigerant pressure above a predetermined pressure.

22. The method of claim 16, further comprising
decreasing the speed of the refrigeration circuit in response to the vehicle condition; and
increasing a speed of the refrigeration circuit in response to an additional condition of the vehicle.

23. The method of claim 22, further comprising initiating a predetermined delay in response to the additional vehicle condition and prior to increasing the speed of the refrigeration circuit.

24. The method of claim 16, further comprising
sensing a load of the propulsion system;
decreasing a speed of the refrigeration circuit in response to the propulsion system load being sensed above a first predetermined value; and
increasing the speed of the refrigeration circuit in response to the propulsion system load being sensed below a second predetermined value.

* * * * *